United States Patent [19]

Ono et al.

[11] 4,070,447
[45] Jan. 24, 1978

[54] PROCESS FOR PREPARING ANHYDROUS ALUMINUM FLUORIDE

[75] Inventors: Tetsuhiro Ono; Minoru Aramaki; Etuo Ushirogouthi, all of Ube, Japan

[73] Assignee: Central Glass Company, Limited, Ube, Japan

[21] Appl. No.: 696,715

[22] Filed: June 16, 1976

[30] Foreign Application Priority Data

June 16, 1975 Japan ................................ 50-72053

[51] Int. Cl.² .......................... C01F 7/50; C01C 1/02; C01C 1/16
[52] U.S. Cl. .................................. 423/489; 423/356; 423/472
[58] Field of Search ........................ 423/489, 356, 472

[56]  References Cited
FOREIGN PATENT DOCUMENTS 635,553  4/1950  United Kingdom ................. 423/489
1,242,565  8/1971  United Kingdom ................. 423/489

Primary Examiner—Edward Stern
Attorney, Agent, or Firm—Fleit & Jacobson

[57] ABSTRACT

Ammonium tetrafluoroaluminate particles having an average particle size above 50μ are reacted with an aluminum compound such as aluminum hydroxide or oxide first at a temperature of 250° C to 300° C and then at a temperature of 350° to 500° C to form crystalline particles of anhydrous aluminum fluoride (II) with an average particle size almost corresponding to the starting ammonium tetrafluoroaluminate. The heating of the crystalline particles to a temperature above 550° C results in formation of aluminum fluoride (I) with a large average particle size.

5 Claims, 1 Drawing Figure

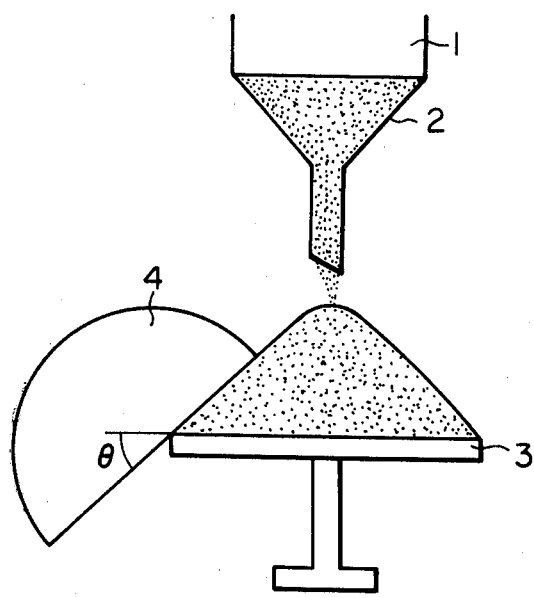

PROCESS FOR PREPARING ANHYDROUS ALUMINUM FLUORIDE

This invention relates to a process for preparing aluminum fluoride, and more particularly to a process for preparing crystalline particles of aluminum fluorides (I) and (II) which allow facilitated bulk handling.

Aluminum fluorides are, of industrial importance, useful as flux for refining aluminum, glaze for ceramics, etc. and are generally employed in the form of crystalline particles for these purposes. In order to handle the crystalline particles in an efficient manner, it is required, as well known in the art, that the particles be relatively large in size and excellent in flowability.

Several processes for the production of aluminum fluoride have been proposed, including (1) a process using a thermal reaction of ammonium fluoride with aluminum oxide according to the following formulae $$6NH_4F + Al_2O_3 + nH_2O \rightarrow (NH_4)_3AlF_6 + \tfrac{1}{2}Al_2O_3 + 3NH_3 + (n + 1\tfrac{1}{2})H_2O$$

$$2(NH_4)_3AlF_6 + Al_2O_3 \cdot xH_2O \rightarrow 3NH_4AlF_4 + \tfrac{1}{2}Al_2O_3 \cdot xH_2O + 3NH_3 + (\tfrac{1}{2}x + 1\tfrac{1}{2})H_2O$$

$$3NH_4AlF_4 + \tfrac{1}{2}(Al_2O_3 \cdot xH_2O) \rightarrow 4AlF_3 + 3NH_3 + (\tfrac{1}{2}x + 1\tfrac{1}{2})H_2O$$

and (2) a process using a thermal reaction of ammonium tetrafluoroaluminate with aluminum oxide according to the following formula $$6NH_4AlF_4 + Al_2O_3 \rightarrow 8AlF_3 + 6NH_3 + 3H_2O$$

However, these processes have a disadvantage that the reaction or sintering is required to be effected at a low heating rate. Particularly the process (2) uses fine particles of a size of 5–10$\mu$ for sintering at a constant low heating rate, so that the resulting crystalline particle product is small in size and poor in flowability and thus inferior in bulk handling characteristics, impeding the working efficiency and producing dust in practical applications. Accordingly, these processes are not necessarily satisfactory from a viewpoint of operational conditions and physical characteristics of the final product.

It is therefore an object of the present invention to provide a process for preparing aluminum fluoride which is excellent in flowability and large in particle size.

It is another object of the present invention to provide a process for preparing aluminum fluoride under controllable reaction conditions at a relatively high rate of heating.

It is a further object of the present invention to provide a process for preparing aluminum fluorides (I) and (II) each in the form of discrete crystalline particles with an average particle size above 50 $\mu$.

It is a still further object of the present invention to provide a process for preparing anhydrous aluminum fluorides (I) and (II) with high purity in high yield.

According to the present invention, there is provided a process for preparing particles of anhydrous aluminum fluoride having a relatively large particle size and excellent flowability, the process comprising interacting ammonium tetrafluoroaluminate particles having an average size above 50 $\mu$ and an aluminum compound such as aluminum hydroxide or aluminum oxide first at a temperature of 250°–300° C to decompose the ammonium tetrafluoroaluminate into $AlF_3(II)$, $NH_4HF_2$ and $NH_3$ and then at a temperature of 350° C to 500° C to react to the $NH_4HF_2$ with the aluminum compound thereby to obtain crystalline particles of anhydrous aluminum fluoride (II) having an average particle size almost corresponding to that of the starting ammonium tetrafluoroaluminate. It has been found that the form and the size of the crystalline particles which are obtained by the interaction of ammonium tetrafluoroaluminate and aluminum hyxroxide or oxide according to the following formula (1) are dictated by and almost correspond to those of the starting ammonium tetrafluoroaluminate $$3NH_4AlF_4 + Al(OH)_3 \rightarrow 4AlF_3 + 3NH_3 + H_2O \tag{1}$$

In order to obtain large-size particles of aluminum fluoride, it is necessary to start with large-sized particles of ammonium tetrafluoroaluminate. The particles of the starting tetrafluoroaluminate should have an average size of about 50 $\mu$, preferably 50–100 $\mu$.

The crystals of the starting ammonium tetrafluoroaluminate having an average particle size above 50 can be conveniently obtained by a process as described in our depending Japanese Patent Application No. 123467/1974. In the process, ammonium hexafluoroaluminate is thermally reaction with aluminum hydroxide or oxide and sulfuric acid at a temperature below 100° C by the following formula (2) using aluminun hydroxide $$4(NH_4)AlF_6 + 2Al(OH)_3 + 3H_2SO_4 \xrightarrow{43} 6NH_4AlF_4 + 3(NH_4)_2SO_4 + 6H_2O \tag{2}$$

In this connection, it is preferred that ammonium hexafluoroaluminate is thermally reacted with excess aluminum hydroxide or oxide sufficient to make the reaction of the formula (1) proceed further as shown in the following formula (3)

$$4(NH_4)_3AlF_6 + 4Al(OH)_3 + 3H_2SO_4 \rightarrow 6NH_4AlF_4 + 2Al(OH)_3 + 3(NH_4)_2SO_4 + 6H_2O \tag{3}$$

During this reaction, the particles of excess aluminum hydroxide or oxide are chemically attacked and imparted with a number of irregularities, remaining in uniformly mixed state with the resulting ammonium tetrafluoroaluminate. As a result, the conversion to $AlF_3$ according to formula (1) is improved to a considerable extent when compared with that attained by a mere mixing of ammonium tetrafluoroaluminate with aluminum hydroxide or oxide.

As a matter of course, the ammonium hexafluoroaluminate used in the above reactions have to be in the form of particles having an average size of above 50 $\mu$, while the aluminum hydroxide or oxide is preferable to be finely powered particles. When aluminum hydroxide is used as an aluminum compound for mixing with ammonium terafluoroaluminate and the mixture is heated at a predetermined rate of heating, part of crystal water of the aluminum hydroxide is first removed at temperatures of 250°–300° C to form a hydrate of aluminum oxide which is porous and greater in surface area. When the heating temperature reaches 250°–300° C, the ammonium tetrafluoroaluminate begins to decompose as shown in the following formula (4)

$$2NH_4AlF_4 \rightarrow 2AlF_3(II) + NH_4 \cdot HF_2 + NH_3 \tag{4}$$

The thus separated ammonium hydrofluoride (NH$_4$HF$_2$) is reacted with the aluminum oxide hydrate according to the following formula (5) to form aluminum fluoride (II)

$$3NH_4HF_2 + Al_2O_3 \cdot xH_2O \rightarrow 2AlF_3(II) + 3NH_3 + (3+x)H_2O \qquad (5)$$

This reaction is a heterogeneous reaction, so that the decomposition takes place vigorously and an extremely large amount of NH$_4$HF$_2$ gas is produced at a time. However, all of such extremely large amount of the gas can not be contacted with the aluminum oxide, lowering the conversion to AlF$_3$. It is therefore preferable to effect the reactions of the formulae (4) and (5) under relatively mild conditions. The reaction rate can be suitably controlled by changing a reaction temperature. In the practice of the invention, the reaction temperature of the reaction (5) should be maintained in the range of 350° to 500° C and the heating rate or speed in the range of 10° to 20° C/min. Since ammonia gas and vapor steam are produced in large amounts, as will be understood from the reaction formulae (4) and (5), and cause the reaction particles to move or fluidize, the reaction system is not required to be forcibly agitated. The reaction is desired to be effected under mild agitating conditions by suitable means such as a rotary kiln. The ratio of aluminum hydroxide or oxide to ammonium tetrafluoroaluminate is generally in the range of 0.9 to 1.5 times, preferably 1.0 to 1.2 times the theoretical ratio for the preparation of aluminum fluoride according to the reaction formula (5).

The produced crystals of anhydrous aluminum fluoride (II) have the same crystal form as the starting ammonium tetrafluoroaluminate and an average particle size of 50 to 100 μ. The aluminum fluoride (II) may be used as catalyst for the isomerization of olefins, addition reaction of HF with acetylene or the like reaction as well as for the afore-mentioned flux and glaze.

The thus obtained anhydrous aluminum fluoride (gamma) is readily transitive to aluminum fluoride (alpha) by heating to a temperature above 550° C. The transition speed increases with an increase of the heating temperature. In this connection, however, too high a temperature will disadvantageously induce decomposition of the aluminum fluoride, so that the temperature is preferred to be in the range of 600° to 800° C. Further, when the transition reaction is conducted without agitation or under mild agitating conditions (with a peripheral speed of the agitating blade below 10 m/min), the produced particles of aluminum fluoride (I) are much inferior in flowability. Presumably, this is because the crystal particles are partially fused with each other upon transition of the fluoride (II) or (I), causing aggragation of the particles. The transition reaction under relatively vigorous agitation has been found to ensure formation of aluminum fluoride (I) with excellent flowability. That is, the aluminum fluoride (I) is obtatined by heating the fluoride (II) to a temperature above 550° C while agitating at a peripheral speed above 10 m/min. The thus obtained aluminum fluoride (I) has almost the same crystal form as the fluoride (II) and an average particle size above 50 μ. It will be noted that the crystal form and particle size of the aluminum fluoride (I) are almost completely dependent on those of the aluminum fluoride (II) as in the case of the fluoride (II). Thus the particle size of the aluminum fluoride (I) can be arbitrarily changed by changing the size of the starting ammonium tetrafluoroaluminate which is generally above 50 μ, preferably 50 to 100 μ. The particles with such a large size are advantageous in operational and handling aspects that dust can be prevented from being produced upon sintering, and that the final particle product is easy to handle. In addition, the transition operation using a peripheral speed above 10 m/min ensure uniform mixing and heating to preclude formation of scales.

The reaction apparatus useful in the production of aluminum fluoride (I) is available in a wide variety but should be able to ensure relatively violent agitation. For example, there may be used a rotary kiln which is equipped with an agitator rotatable at a peripheral speed of above 10 m/min. Alternatively, a fluidized bed or moving bed apparatus may also be used for this purpose.

The present invention will be particularly illustrated by way of the following examples. In the examples, the degree of flowability of aluminum fluoride particles is expressed in terms of the angle of repose. The angle of repose is the maximum slope, expressed in degrees, which piled material or particles will stand without sliding on itself when the particles are gently dropped from a suitable means such as a funnel on a horizontal plane. The particles with a smaller angle or repose are susceptible to flow more easily. The angle of repose of aluminum fluoride particles to be employed for refining of aluminum is preferred to be below 35°. In the examples, the angle of repose was measured by Powder Tester (Model Pt-D, produced by Hosokawa Tekkosho), in the absence of any prescribed or standardized measuring methods known to us. With reference to the drawing, the angle of repose was measured as follows in the Examples of the specification. Sample particles were dropped on a circular table 3 of 70 mm in diameter through a 24 mesh sieve 1 and a funnel 2 to form a pile on the table 3. The angle of repose is then determined by means of a graduator 4 when the maximum slope is reached.

EXAMPLE 1

To a slurry containing 352 g (340 g in a solid form and 12 g in a dissolved form) of ammonium hexafluoroaluminate obtained by interaction of ammonium fluoride and aluminum hydroxide, 70 g of aluminum hydroxide and 8 g of free ammonia was continuously added 158 g of 98% sulfuric acid with agitation for reaction at 80° C for 30 min to obtain 324 g of ammonium tetrafluoroaluminate. To 182 g of the ammonium tetrafluoroaluminate was added 44 g of commercially available aluminum hydroxide having a size distribution shown in Table 1. The resulting mixture was heated in a small-sized rotary kiln at 260° C for 10 min and the temperature was then raised to 400° C, followed by reaction at the same temperature for 40 min to obtain 169 g of aluminum fluoride (II). The thus obtained aluminum fluoride (II) had a purity of 95.9 % (and a balance of Al$_2$O$_3$), a size distribution as shown in Table 1 below, and angle of repose of 31°, and a yield of 97.0% based on the fluorine atom.

Table 1

|  | Size Distribution | | | | |
|---|---|---|---|---|---|
|  | above 100μ | 100–80μ | 80–50μ | 50–20μ | below 50μ |
| ammonium tetrafluoro-aluminate | 15 | 34.0 | 30.0 | 15.0 | 6.0 |
| aluminum hydroxide | 6.0 | 20.0 | 40.0 | 23.0 | 11.0 |
| aluminum fluoride (II) | 10.0 | 31.0 | 35.0 | 17.0 | 7.0 |

Table 1-continued

| | Size Distribution | | | | |
|---|---|---|---|---|---|
| | above 100μ | 100–80μ | 80–50μ | 50–20μ | below 50μ |
| aluminum fluoride (I) | 10.0 | 32.0 | 34.0 | 15.0 | 9.5 |

The aluminum fluoride (II) was subjected to an X-ray diffraction analysis for identification by Hanawalt's method using lattice spacings, d, and relative intensities I/Io. As result, the fluoride (II) was found to correspond to γ-AlF₃ (i.e., AlF₃(II)) of the X-ray diffraction Table of "Powder Diffraction File, Inorganic" as shown in Table 2 below.

Table 2

| Inorganic 20-6 (or γ-AlF₃) of Powder Diffraction File | | AlF₃(II) of Example 1 | |
|---|---|---|---|
| d | I/Iₒ | d | I/Iₒ |
| 6.03 | 100 | 6.03 | 60 |
| 3.55 | 95 | 3.55 | 100 |
| 3.06 | 5 | 3.06 | 2 |
| 2.999 | 45 | 3.00 | 25 |
| 2.500 | 5 | — | — |
| 2.270 | 10 | 2.273 | 3 |
| 2.129 | 10 | 2.128 | 4 |
| 2.003 | 15 | 2.004 | 10 |

150 g of the thus obtained aluminum fluoride (II) was placed in a sintering furnace equipped with an agitator rotated at a peripheral speed of 10 m/min and heated to 650° C for 20 min to obtain 149 g of product. As a result of X-ray analysis, the product was found to be AlF₃ (I) as understood from Table 3 below and had a purity of 94.7 %, a size distribution shown in Table 1, an angle of repose of 33° and a yield of 98.1% based on the fluorine atom.

Table 3

| Inorganic 9-138 (or AlF₃(I)) of Powder Diffraction File | | Product of the Sintered Product | |
|---|---|---|---|
| d | I/Iₒ | d | I/Iₒ |
| 3.52 | 100 | 3.52 | 100 |
| 2.51 | 4 | 2.51 | 3 |
| 2.119 | 20 | 2.118 | 25 |
| 2.074 | 2 | 2.074 | 4 |
| 2.019 | 2 | 2.020 | 3 |
| 1.759 | 25 | omitted | |
| 1.600 | 4 | | |
| 1.587 | 16 | | |
| 1.560 | 8 | | |

When the above process was repeated using a fluidized bed reactor, similar results were obtained.

EXAMPLE 2

The general procedure of Example 1 was repeated using 332 g of 35 % hydrochloric acid added to the slurry of ammonium hexafluoroaluminate, aluminum hydroxide and ammonia, thereby to obtain 324 g of ammonium tetrafluoroaluminate having a size distribution shown in Table 4.

182 g of ammonium tetrafluoroaluminate was admixed with 44 g of commercially available aluminum hydroxide (having a size distribution of Table 1) and the mixture was treated in the same manner as in Example 1 to obtain 169 g of aluminum fluoride (AlF₃(II)). The X-ray diffraction analysis revealed that the fluoride product was identical to that of Table 2. The AlF₃ product obtained had a purity of 96.0%, a size distribution similar to that of the starting ammonium tetrafluoroaluminate as shown in Table 4, an angle of repose of 31°, and a yield of 97.1% based on the fluorine atom of the starting material.

150 g of the thus obtained aluminum fluoride (II) was placed in a sintering furnace equipped with an agitator rotated at a blade peripheral speed of 20 m/min and heated to 650° C for 20 min to obtain 149 g of product. As a result of the X-ray analysis, the product was confirmed to be AlF₃(I) identical to that of Table 2. The AlF₃(I) product has a purity of 95.0%, a size distribution corresponding to that of the aluminum fluoride (II) as shown in Table 4, an angle of repose of 31°, and a yield of 98.3% based on the fluorine atom of the starting aluminum fluoride (II).

For comparison, 150 g of the aluminum fluoride (II) was likewise placed in a sintering furnace equipped with an agitator rotated at a blade peripheral speed of 1 m/min and heated to 650° C for 20 min, thereby to obtain 149 g of product. As a result of the X-ray analysis, the product was confirmed to be substantially composed of AlF₃(I) shown in Table 2. Though the AlF₃(I) product had a purity of 94.9%, a size distribution shown in Table 4, and a yield of 98.2%, the angle of repose, a measure of flowability, was as great as 39°.

Table 4

| | Size Distribution (%) | | | | |
|---|---|---|---|---|---|
| | above 100μ | 100–80μ | 80–50μ | 50–20μ | below 20μ |
| ammonium tetrafluoro-aluminate | 15.5 | 34.5 | 30.5 | 13.5 | 6.0 |
| aluminum fluoride (II) | 10.0 | 31.0 | 35.5 | 16.5 | 7.0 |
| aluminum fluoride (I) | 10.0 | 32.5 | 33.5 | 15.0 | 9.0 |
| aluminum (for comparison) | 9.5 | 32.0 | 32.0 | 18.0 | 8.5 |

COMPARATIVE EXAMPLE 1

A slurry which comprised of ammonium hexafluoroaluminate, as obtained in Example 1, aluminum hydroxide and ammonia was placed in a pressure reactor for reaction over 1 hour with agitation to obtain 341 g of a solid particulate product (having a particle size distribution shown in Table 5) composed of 93.6 % of ammonium tetrafluoroaluminate, 5.1 % of ammonium hexafluoroaluminate and 1.3% of aluminum hydroxide. 182 g of the product was admixed with 44 g of commercially available aluminum hydroxide (of a size distribution of Table 1), followed by a treatment same manner as in. Example 1 to obtain 165 g of aluminum fluoride (AlF₃(II)). The X-ray analysis revealed that the fluoride product had almost the same lattice spacings and relative intensities as those of AlF₃(II) shown in Table 2. The AlF₃(II) product thus obtained had a purity of 95.5%, a size distribution of Table 5 and a yield of 95.3%. However, the angle of repose or flowability was as great as 40°. Then, the AlF₃(II) poduct was heated to 650° C for 20 min in a sintering furnace equipped with an agitator rotated at a blade peripheral speed of 20 m/min. The resultant particulate product was found by an X-ray diffraction analysis to be identical to the AlF₃(I) of Table 2. However, the angle of repose of the particulate product reached 42°.

Table 5

| | Size Distribution (%) | | | | |
|---|---|---|---|---|---|
| | above 10μ | 10–8μ | 8–5μ | 5–2μ | below 2μ |
| aluminum tetrafluoro-aluminate | 10.0 | 25.0 | 37.0 | 21.0 | 7.0 |
| aluminum fluoride (II) | 27.0 | 22.0 | 31.0 | 15.0 | 5.0 |

COMPARATIVE EXAMPLE 2

To a slurry comprises of ammonium hexafluoroaluminate, aluminum hydroxide, and ammonia was added 158 g of 98% sulfuric acid at a time in the same manner as in Example 1 for reaction at 80° C for 30 min under agitation. Solid matter was separated from the resultant reaction mixture to obtain 324 g of ammonium tetrafluoroaluminate. 182 g of the ammonium tetrafluoroaluminate was admixed with 44 g of commercially available aluminum hydroxide in the form of particles (having a size distribution of Table 1), followed by heating at 260° C for 10 min and being raised to 400° C for treatment at 400° C for 40 min. As a result, 169 g of aluminum fluoride ($AlF_3(II)$) was obtained. The X-ray diffraction analysis revealed that the fluoride product was identical to that of Table 2, with a purity of 95.9%, a size distribution indicated in Table 6 below, an angle of repose of 36° and a yield of 97.0%.

Then, 150 g of the aluminum fluoride (II) was heated at 650° C for 20 min in a sintering furnace equipped with an agitator rotated at a blade peripheral speed of 20 m/min thereby to obtain 149 g of product. The X-ray diffraction analysis revealed that the product was identical to $AlF_3(I)$ of Table 2. The $AlF_3(I)$ product had a purity of 94.7 %, a size distribution shown in Table 6, an angle of repose as great as 37°, and a yield of 98.1% based on the fluorine atom.

Table 6

| | Size Distribution (%) | | | | |
|---|---|---|---|---|---|
| | above 40μ | 40–30μ | 30–20μ | 20–10μ | below 10μ |
| ammonium tetrafluoroaluminate | 6.0 | 20.0 | 30.0 | 21.0 | 23.0 |
| aluminum fluoride (II) | 20.0 | 22.0 | 26.0 | 16.0 | 16.0 |
| aluminum fluoride (I) | 19.0 | 22.0 | 27.0 | 15.0 | 17.0 |

What is claimed is:

1. A process for preparing crystalline particles of anhydrous aluminum fluoride having a relatively large particle size and excellent flowability, said process comprising the steps of interacting ammonium hexafluoroaluminate, an inorganic acid selected from the group consisting of sulfuric acid and hydrochloric acid and an aluminum compound selected from the group consisting of aluminum hydroxide and aluminum oxide at a temperature of below 100° C to obtain ammonium tetrafluoroaluminate particles having an average size of above 50 microns; interacting said ammonium tetrafluoroaluminate particles having an average size above said 50 microns and an aluminum compound selected from the group consisting of aluminum compound selected from the group consisting of aluminum hydroxide and aluminum oxide first, at a temperature of from between about 250° to 300° C to decompose the ammonium tetrafluoroaluminate into γ-aluminum fluoride, $NH_4HF_2$ and $NH_3$ and then at a temperature of between about 350° to 500° C to react said $NH_4HF_2$ with said aluminum compound to thereby obtain crystalline particles of γ-anhydrous aluminum fluoride having an average particle size corresponding essentially to that of the starting ammonium tetrafluoroaluminate.

2. A process for preparing crystalline particles of anhydrous aluminum fluoride having a relatively large particle size and excellent flowability, said process comprising the steps of interacting ammonium tetrafluoroaluminate particles having an average size above 50 microns and an aluminum compound selected from the group consisting of aluminum hydroxide and aluminum oxide first at a temperature of from between 250° to 300° C to decompose the ammonium tetrafluoroaluminate into γ-aluminum fluoride, $NH_4HF_2$ and $NH_3$ and then at a temperature of between about 350° to 500° C to react said $NH_4HF_2$ with said aluminum compound to thereby obtain crystalline particles of γ-anhydrous aluminum fluoride having an average particle size corresponding essentially to that of the starting ammonium tetrafluoroaluminate, said process further comprising heating said crystalline particles of said γ-anhydrous aluminum fluoride to a temperature above 550° C under agitation conditions of a peripheral speed of above 10 m/min. to thereby produce crystals of α-anhydrous aluminum fluoride.

3. The process in accordance with claim 1 wherein the reaction temperature is raised at a rate of 10°–20° C per minute until the temperature reaches 350° to 500°.

4. The process in accordance with claim 1 wherein said aluminum compound is present in an amount in the range of from between about 0.9 to 1.5 times the theoretical ratio of said aluminum compound to said ammonium tetrafluoroaluminate required for the preparation of aluminum fluoride in accordance with the formula

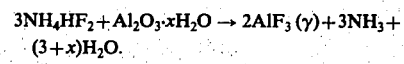
$3NH_4HF_2 + Al_2O_3 \cdot xH_2O \rightarrow 2AlF_3(\gamma) + 3NH_3 + (3+x)H_2O.$ 5. The process in accordance with claim 4 wherein said aluminum compound is present in an amount in the range of from between about 1.0 to 1.2 times the theoretical ratio of said aluminum compound to said ammonium tetrafluoroaluminate required for the preparation of aluminum fluoride in accordance with the formula

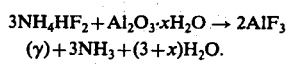
$3NH_4HF_2 + Al_2O_3 \cdot xH_2O \rightarrow 2AlF_3(\gamma) + 3NH_3 + (3+x)H_2O.$

* * * * *